(No Model.)

H. MYERS.
WHEEL TIRE.

No. 456,705. Patented July 28, 1891.

Witnesses:
Hermann Bormann
M. E. Myers

Inventor:
Henry Myers

UNITED STATES PATENT OFFICE.

HENRY MYERS, OF PHILADELPHIA, PENNSYLVANIA.

WHEEL-TIRE.

SPECIFICATION forming part of Letters Patent No. 456,705, dated July 28, 1891.

Application filed March 27, 1891. Serial No. 386,642. (No model.)

*To all whom it may concern:*

Be it known that I, HENRY MYERS, a citizen of the United States, residing at Philadelphia, in the county of Philadelphia and State of Pennsylvania, have invented certain new and useful Improvements in Wheel-Tires, of which the following is a specification.

My invention relates to elastic wheel-tires employed in cycles and other vehicles, and more particularly to the class known as "inflatable" tires. The objections experienced in the use of the inflated tire heretofore known are, first, that when the inflated tubing or hollow tire is cut by sharp points or stones on the roadway the vehicle is rendered entirely useless, as the inflating agent of the tire escapes through such cuts, which causes the collapsing of the hollow tire; second, the cock on the nozzle, provided for the admission of the inflating agent, may easily be opened by accident or otherwise, which will have the same result of collapsing the tire. To overcome these objections I provide a metal or other tire of any preferable cross-section with an inflatable tire made in sections composed of rubber or other analogous elastic material, so that when any one or more sections are cut and destroyed the remaining sections will uphold the desired effect of retaining a perfect flexible and easy-running tire.

Another object of my invention is to prevent any slipping of the wheel-tire on a slippery or other roadway, which is entirely obviated by my sectional tire, as each section thereof will substantially form a flexible tooth, engaging with and grabbing into the cavities of the roadway.

My invention consists of a tire composed of hollow sections in the shape of bulbs or boxes. These sections may or may not be inflated with air, gas, or liquid, and are secured to an elastic band sprung on or into a metallic tire.

My invention will be more fully understood taken in connection with the accompanying drawings forming part hereof, and in which—

Figure 1:
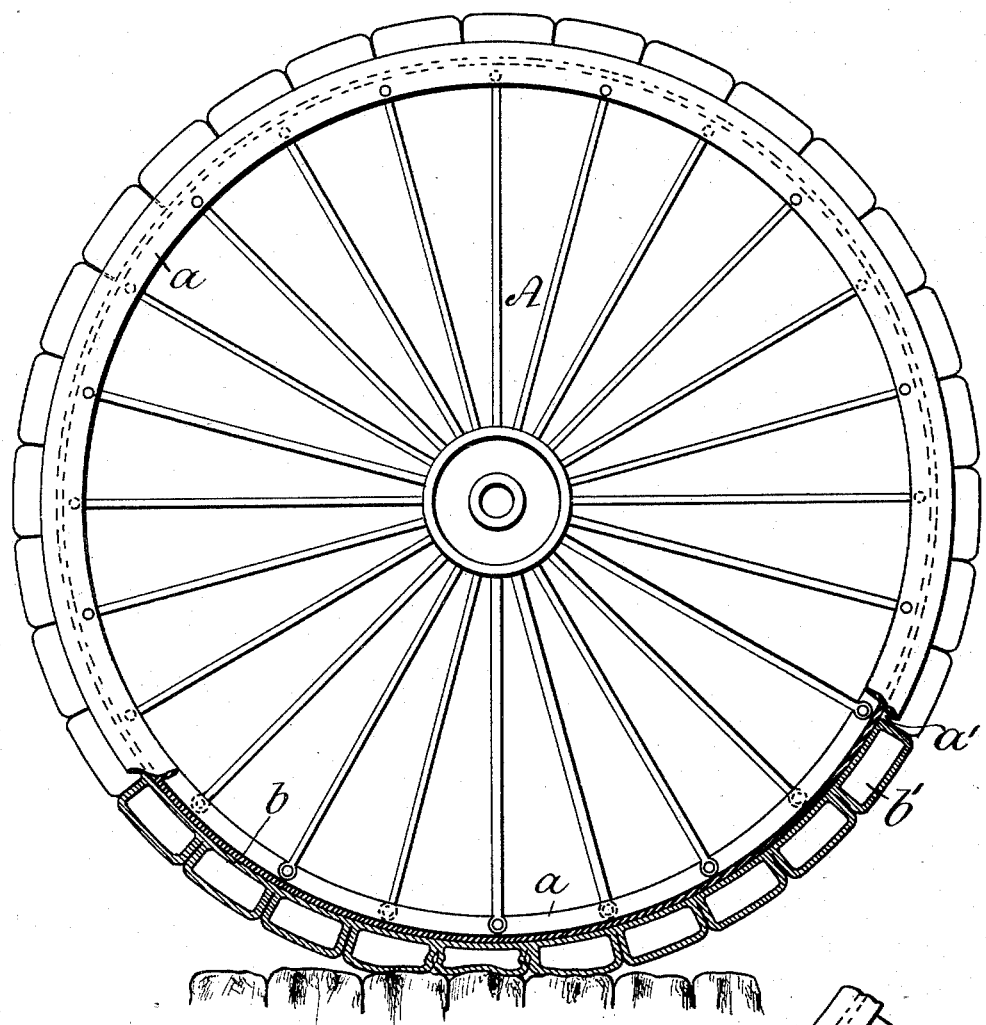
Figure 2:
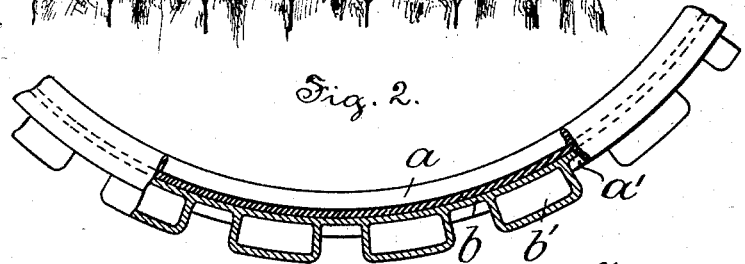

Figure 1 is an elevation of a wheel having a metal tire provided with an elastic band, to which inflated sections are secured. Fig. 2 is a portion of a wheel having its tire provided with a rubber band, to which inflated bulbs are attached at intervals.

Referring now to the drawings for a further description of my invention, A is a wheel provided with the usual tire *a*.

*b* is an endless band made of rubber or other suitable material, adapted to be sprung into or held in the groove *a'* of the tire *a*.

*b'* are inflated bulbs or hollow castings of rubber cemented to or formed integral with the band *b*. These bulbs may be placed close together, as shown in Fig. 1, or at short intervals, as shown in Fig. 2, which latter form may be preferred in the construction of wheels of large diameter. It will be readily understood that the sections are made of such lengths as that two or more of them will contact with the roadway, so that in case of one being mutilated the adjacent sections will uphold the desired flexibility of the tire.

Having thus described the nature and object of my invention, what I claim as new, and desire to secure by Letters Patent, is—

A flexible wheel-tire adapted to be held in position by a metal tire, said flexible tire composed of an endless band having bulbs attached thereto to form a discontinuous thread portion of said tire, substantially as described.

In witness whereof I have hereunto set my signature in presence of two witnesses.

HENRY MYERS.

Witnesses:
HERMANN BORMANN,
M. E. MYERS.